Figure 1:
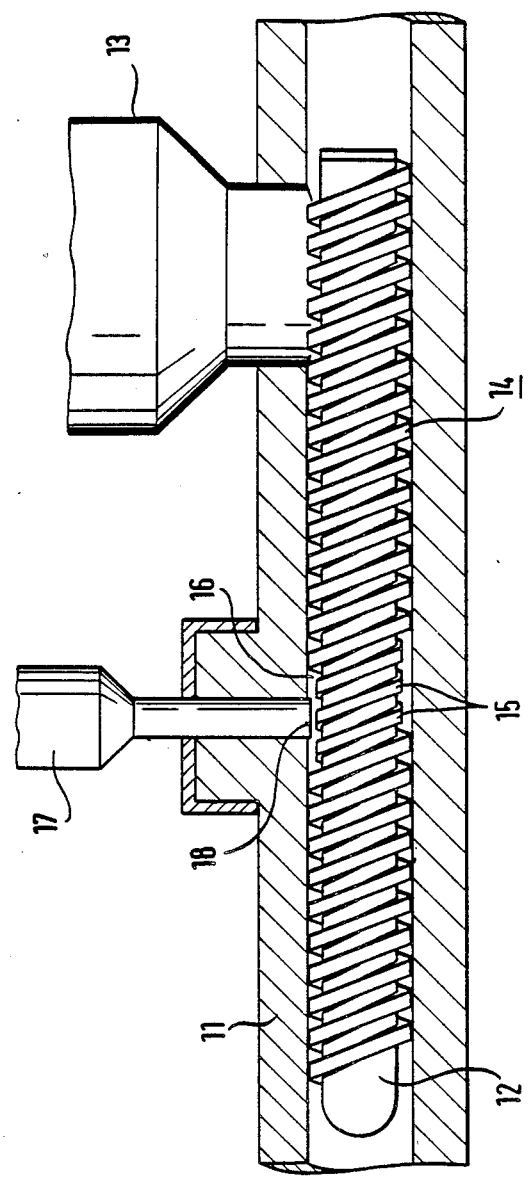

United States Patent [19]

Wessling et al.

[11] Patent Number: 4,935,164
[45] Date of Patent: Jun. 19, 1990

[54] PROCESS FOR PRODUCING MOULDABLE POLYMER BLENDS

[75] Inventors: Bernhard M. Wessling; Harald K. Volk, both of Bargteheide, Fed. Rep. of Germany

[73] Assignee: Zipperling Kessler & Co. (GmbH & Co.), Ahrensburg, Fed. Rep. of Germany

[21] Appl. No.: 744,273

[22] Filed: Jun. 13, 1985

[30] Foreign Application Priority Data

Jun. 15, 1984 [DE] Fed. Rep. of Germany ....... 3422316

[51] Int. Cl.$^5$ .......................... H01B 1/00; H21B 1/06
[52] U.S. Cl. .................................... 252/500; 252/518; 252/519; 525/191; 525/197; 525/201; 525/202
[58] Field of Search ............... 252/500, 518, 512, 519; 525/285, 275, 197, 191, 192, 198, 199, 202; 524/80, 401

[56] References Cited

U.S. PATENT DOCUMENTS

| | | |
|---|---|---|
| 3,632,526 | 1/1972 | Yamamoto et al. |
| 4,359,441 | 11/1982 | Barker et al. |
| 4,394,304 | 7/1983 | Wnek ................................. 252/500 |
| 4,670,511 | 6/1987 | Weddigen et al. |

OTHER PUBLICATIONS

Miyasaka et al., *Journal of Materials Science*, 17, (1982), 1610–1616.
Burrell, *Solubility Parameters for Film Formers*, Official Digest, Oct. 1955, pp. 726–758.
Medalia, A. I., "Rubber Chemistry and Technology", 59, pp. 432–454, (1986).

*Primary Examiner*—Josephine Barr
*Attorney, Agent, or Firm*—Cushman, Darby and Cushman

[57] ABSTRACT

Substantially monomer-free, electrically conductive organic polymers and/or organic conductors are dissolved or dispersed in a melt or solution of a thermoplastic matrix polymer or polymer mixture partially compatible therewith and having a solubility parameter $>8.6$ $(cal/cm^3)^{\frac{1}{2}}$, in order to obtain mouldable polymer blends. The latter are suitable for producing moulded articles, particularly for electrical conductors, semiconductors or photoconductors. A suitable apparatus for producing the polymer blends comprises an extruder or kneader, through whose barrel one or more sonotrodes project into the transformation zone.

20 Claims, 5 Drawing Sheets

PROCESS FOR PRODUCING MOULDABLE POLYMER BLENDS

BACKGROUND OF THE INVENTION AND PRIOR ART

The synthesis, as well as the chemical, electrical and photoelectrical characteristics of nonpolymeric and polymeric organic semiconductors and conductors have formed the subject of intense research. The state of present knowledge, as well as the in part differing opinions have been discussed in numerous works, cf G. Wegner, Angew. Chem. Vol. 93, pp. 352 to 371, 1981; M. Hanack, Naturwiss, Vol. 69, pp. 266 to 275, 1982; A. Heeger et al, Synthetic metals, Vol. 6, pp. 243 to 263, 1983; and K. Seeger, Angew. Makromol. Chem., Vol. 109/110, pp. 227 to 251, 1982.

The term "conductive polymers" is understood to mean polyconjugate systems, such as occur in polyacetylene (PAc), poly-1,3,5 . . . n-substituted polyacetylenes, acetylene copolymers, as well as 1,3-tetramethylene-bridged polyenes, e.g. polymers resulting from the polymerization of 1,6-heptadiene and similar polyacetylene derivatives. It also includes the various modifications of polyparaphenylenes (PPP), the different modifications of polypyrroles (PPy), the different modifications of polyphthalocyanines (PPhc) and other polymeric conductors, such as polyanilines, polyperinaphthalines etc. They can be present as such or as polymers complexed ("doped") with oxidizing or reducing substances. Complexing generally leads to an increase in the electrical conductivity by several decimal powers and into the metallic range.

The term "organic conductors" is understood to mean nonpolymeric, organic substances, particularly complex salts or charge transfer complexes, e.g. the different modifications of tetracyanoquinodimethane (TCNQ) salts.

Conductive polymers are in part obtained as polycrystalline powders, film-like agglomerates or lumps of primary particles. As e.g. polyacetylene is neither soluble nor fusible, it constituted an important advance when Shirakawa was able to produce self-supporting, but very thin films by interfacial polymerization, whose characteristics are similar to those of thin polymer films. Tests carried out on these films concerning the morphology of polyacetylene led to a fibril theory, according to which the polyacetylene is assembled to give elongated fibres through which crystalline regions form in the fibre direction, in which the current flows along the fibre axis following doping (complexing).

The general opinion is that the conductivity is brought about by the high crystallinity and by the arrangement of the polyconjugate systems (optionally in complexed form). However, it has not as yet been adequately clarified whether the conductivity mechanism in polyenes and polyphenylenes, as well as polypyrroles is determined by electron transfers along the chain or at right angles to the chain direction, particularly as the morphology of conductive polymers has also not yet been clarified. In this connection, the inventor has proved that the primary particles of polyacetylene are always extremely fine spherical particles, which in part agglomerate to fibrillar secondary particles and in part agglomerate to non-directed foil-like film, cf B. Wessling, Makromol. Chem., Vol. 185, 1265-1275, 1984. By reference the contents of this paper form part of the disclosure of the present description.

The literature provides the following information concerning the physical characteristics and processability of conductive polymers and organic conductors:

High crystallinity, e.g. polycrystalline powders, in individual cases long needle-shaped crystals (for TCNQ, cf Hanack, 1982), or other macroscopic crystal shapes, e.g. in the case of polyphthalocyanines. In the case of polyacetylene, the size of the crystallites clearly does not exceed 100 Å (D. White et al, Polymer, Vol. 24, p. 805, 1983).

Polyconjugate polymers, are, in their basic state, insulators, as opposed to polymer-bridged charge transfer complexes, such as polyphthalocyanines (cf Hanack, loc. cit, pp. 269/270).

Optical appearance generally matt black (glossy or shining only if the synthesis was carried out on the smooth surfaces, cf the Shirakawa method for producing self-supporting "films", in which the side facing the glass is glossy and that remote from the glass matt). Polyphthalocyanines are non-glossy powders, which appear blue.

If, as a result of the synthesis conditions, macroscopically larger structures can be obtained, they are brittle (the exception being cis-polyacetylene). Due to their crystalline structure, charge transfer complexes are always very brittle substances, which are very difficult to process mechanically (Hanack, loc. cit, pp. 269/270). Much the same applies for uncomplexed and particularly complexed conductive polymers.

Conductive polymers and organic conductors are generally insoluble, infusible and not shapable, whilst in most cases being unstable relative to oxygen, moisture and elevated temperatures. If e.g. in the case of nonpolymeric or polymeric charge transfer complexes (TCNQ or PPhc), melting points can in fact be observed, they are close to the decomposition point, so that decomposition-free melting is either impossible or is only possible with great difficulty. To the extent that soluble derivatives exist in the case of the different conductive polymers, their conductivity is several decimal powers inferior compared with the insoluble non-modified substances. A thermoplastic deformation of conductive polymers and organic conductors has not as yet proved possible. Polypyrrole and certain representatives of the polyphthalocyanines are comparatively stable with respect to oxidative and thermal influences, cf Hanack, loc. cit; K. Kanazawa et al, J. Chem. Soc., Chem. Comm. 1979, pp. 854/855.

Hanack's 1982 statement that most organic conductors and conductive polymers were primarily produced under the standpoint of high conductivity, whilst ignoring their mechanical properties, stability and processability, still applies. The following statements are made regarding the physical characteristics of organic conductors and conductive polymers which are important for processability.

Insolubility

Whilst nonpolymeric organic conductors are crystallized from solutions of the two participating components and are in part still soluble in decomposition-free manner after their preparation, a solvent has not hitherto been found for conductive polymers either in the untreated or complexed form. The tests described by T. Matsumoto et al, J. Polym. Sci. A-2, Vol. 10, p. 23, 1972 with polyacetylene from polymerization induced by γ-radiation clearly did not relate to polyacetylene with the chemical uniformity as discussed here and as shown by IR-spectra, but instead related to non-uniform mixtures of different types of substituted, low molecular weight polyenes. The dissolving of polyacetylene in hot sulphuric acid (S. Miyata et al, Polym. J., Vol. 15, pp. 557 to 558, 1983) leads to strongly oxidized, chemically changed products (A. Pron, Polymer, Vol. 24, p. 1294ff, 1983).

Solvents have also not hitherto been described for other conductive polymers. Attempts have been made for polyphthalocyanines to increase the solubility by introducing ring substituents, e.g. tert.butyl groups, but the conductivity decreases by several decimal powers. T. Inabe et al, J. Chem. Soc., Chem. Comm, 1983, pp. 1984–85 describe the dissolving of polyphthalocyanine in trifluoromethane sulphonic acid, but give no information on the characteristics of the raw material recovered therefrom.

In addition, no solvents or processes are known enabling true, deposition-stable dispersions to be prepared. Although EP-OS 62,211 describes polyacetylene suspensions these are in fact only suspended, coarse polyacetylene particles, without deagglomeration of the tertiary or secondary structure of the particles.

Melting behaviour

Both in the untreated and complexed forms, all conductive polymers cannot be melted. Although differential thermal analysis of polyphthalocyanines gives certain indications of a melting behaviour, this is accompanied by immediate decomposition. Dynamoviscoelastic tests on polyacetylene (Shox-an Chen et al., Makromol. Chem. Rapid Comm., Vol. 4, pp. 503–506, 1983) show that between −100° and +350° C. there is neither a glass transition temperature nor a crystalline melting. Polyacetylene decomposition starts from approximately 350° C. The only phase transition in this range takes place at above 150° C. and is attributed to cis/trans-isomerization.

Admittedly, meltable or fusible conductive polymers have occasionally been described, but their conductivity was never satisfactory and was several decimal powers lower than in the case of the polymers under discussion here.

Stability

Numerous reports deal with the instability of conductive polymers. Polyacetylene is particularly sensitive to oxygen and it was reported that even when stored under an inert atmosphere and in the cold, the original polyacetylene characteristics were lost. For example, after a certain time it can no longer be stretched. Even when stored in an inert atmosphere, complexed polyacetylenes almost completely lose their excellent electrical properties after a short time. These phenomena are attributed to an oxidative decomposition and to crosslinking processes, which also occur in the case of cis/trans-isomerization (cf inter alia M. Rubner et al, J. Polym. Sci., Polym. Symp. Vol. 70, pp. 45–69, 1983). The instability of polymers from 1,6-heptadiene is described by H. Gibson, J. Am. Chem. Soc., Vol. 105, pp. 4417 to 4431, 1983. During heating in vacuo, this is rearranged into undefined, no longer conjugate polymers and comparable processes take place in the case of polyacetylene.

Formability

It has hitherto proved impossible to produce moulded articles from conductive polymers or organic conductors by the masters forming and shaping processes (Kunststoff-Taschenbuch, p. 58ff). This is directly linked with the fact that the polymers are infusible and insoluble. It has also proved impossible up to the present to produce true dispersions of these substances in organic solvents or in viscous polymers.

Cis-polyacetylene to a certain extent would appear to represent an exception in that immediately following production is to a limited extent "ductile", as described by M. Druy et al, J. Polym. Sci., Polym. Phys., Vol. 18, pp. 429–441, 1980. However, the ductility and stretchability is limited exclusively to the cis-isomer, the transisomer being brittle even in the absence of oxygen. A. MacDiarmid and A. Heeger, proceedings of a Nato ASI on Molecular Metals Les Arcs, 1979, plenary lecture, state that fresh "films" of both cis and trans-polyacetylene are flexible and easily stretchable, the latter being attributed to the partial orientation of the fibres. Shortly after synthesis, the cis-isomer also loses the ductility properties, even in the absence of oxygen, which have an extreme accelerating action on embrittlement. This is inter alia due to the fact that oxygen not only brings about an oxidative decomposition, but also leads to cis/transisomerization (J. Chien et al, J. Polym. Sci., Polym. Phys., Vol. 21, pp. 767 to 770, 1983). According to Druy, loc. cit., a volume increase unexpectedly occurs during stretching, which can be explained by the weak interfibrillar forces of attraction. It is also concluded from the stress-strain curves and the time behaviour that, even in the absence of oxygen, crosslinking processes take place, possibly due to the appearance of free radicals during cis/transisomerization.

As a result of these difficulties, shaping involves the use of methods which cannot be considered a master forming process. Thus, Shirakawa et al in EP-OS 26,235 describe the shaping of a gel-like polyacetylene with a solvent content of 5 to 95% by weight, which is moulded at temperatures between ambient temperature and 100° C., which leads to moulded articles which are subsequently dried. The same procedure is adopted by Kobayashi et al (GB-OS 2,072,197) whereby freshly polymerized cis-polyacetylene with comparatively high solvent contents is moulded and subsequently calendered. Before the drying process, the end product still contains approximately 5% of solvent.

A production of moulded articles, once again not by the master forming process, is described by Chien et al, Makromol. Chem. Rapid Comm., Vol. 4, pp. 5–10, 1983, who produced macroscopic polyacetylene strips by special polymerization methods.

J. Hocker et al (EP-OS 62,211) describe the production of moulded articles from polyacetylene-containing polymers, which are dissolved in a solvent containing macroscopic polyacetylene particles. Shaping takes place by removing the solvent. For accelerating suspension formation, optionally an Ultraturrax ® stirrer is used, the fibrous structure of the particles being retained. The thus obtained moulded articles have only a comparatively low conductivity. The further EP-OS 84,330 of the same inventors also deals with attempts to obtain moulded articles from polyacetylene-containing plastics, without using a master forming process. Attempts are made in the examples to produce laminates with a (doped) polyacetylene layer, in that polyacetylene in the form of a suspension in an easily evaporatably solvent, such as methylene chloride, is sprayed onto a substrate. The thus obtained polyacetylene layer on a polymer or an organic carrier is subsequently coated with a further protective layer.

In the case of polypyrrole, DE-OS 3,227,914 describes a process, in which polypyrrole is moulded at temperatures of 150° to 300° C. and pressures of 50 to 150 bar. According to the examples, this process is suitable for producing multilayer laminates of nonconductive polymer films and polypyrrole films (as are directly obtained from electrochemical polymerization). Preferably, polypyrrole and the various copolymers thereof are pressed in film form onto polyester, polyethylene or polyacrylonitrile films or on polyurethane or polystyrene foam. There is clearly no shaping of the conductive polypyrrole and instead the thermoplastic flowability of the non-conductive polymer films permits the use thereof as binders. Homogeneous moulded articles from a continuous polypyrrole phase or moulded articles consisting solely of polypyrrole cannot be produced this way. A further disadvantage is that the process time under non-inert conditions is 2 to 10 minutes, non-conductive coatings forming on the surface and it is not possible to exclude chemical decomposition processes.

Polymer blends with conductive polymers

In order to obviate the aforementioned difficulties, many attempts have been made to incorporate conductive polymers or organic conductors into a polymer matrix and consequently achieve mouldability. Within the frame work of the work leading to the present invention, it has however been found that the subsequent incorporation of conductive polymers and organic conductors causes serious problems, because a homogeneous distribution is not obtained. In fact, the conductive polymers are present in the matrix in the form of macroscopic agglomerates (black spots) and in this way impair the mechanical characteristics thereof, without positively influencing the electrical characteristics to the desired extent.

This can largely be attributed to difficulties in the dispersion and a lack of compatibility between the conductive polymers or organic conductors and the matrix polymer. This is indirectly confirmed by the fact that no reference is made thereto in the technical literature. With the clear intention of obviating these problems, attempts have also been made to produce polymer blends by carrying out the polymerization of the conductive polymer in the carrier polymer matrix or the polymerization of the carrier polymer in a suspension containing conductive polymer particles. M. Galwin and G. Wnek, J. Polym. Sci. Polym. Chem., Vol 21., pp 2727 to 2737, 1983 polymerized acetylene on and in a LDPE film, which was impregnated with Ziegler-Natta catalysts. The mechanical characteristics were interesting, the polymer blend obtained can be doped with iodine from the gaseous phase, conductivity of >5 Siemens/cm being attainable with a polyacetylene proportion of more than approximately 10%. However, no information is given on the conductivity and other characteristics following further processing of the films via the thermoplastic phase or after processing the blend.

U.S. Pat. No. 4,359,411 has a similar objective and according to it TCNQ salts in the form of a crown ether complex are incorporated into a thermoplastic polymer matrix. Whilst the finished compound can be readily shaped and has good mechanical characteristics, the conductivity of max. $10^{-6}$ Siemens/cm is far from adequate and is several decimal powers below the value of the TCNQ salts.

Another procedure was adopted by T. Inabe et al, J. Chem. Soc. Chem. Comm. 1983, pp. 1084/1085 in that they prepared concentrated solutions of a polyphthalocyanin in trifluoromethane sulphonic acid and aramide fibers and spun the same in a water bath. This gave dopable fibres which, as expected, were extremely brittle, because the strength of aramide fibres is based on the special molecular orientation, which is disturbed by the incorporation of foreign substances.

SUMMARY OF PRIOR ART AND OBJECTS OF THE INVENTION

Thus, conductive polymers and organic conductors together have a number of restricting disadvantages (insolubility, poor dispersibility, inadequate softening ranges or glass transition temperatures, non-existent melting points and lack of stability relative to oxygen, heat and in part crosslinking processes), which have hitherto prevented the industrial utilization thereof. In the present state of the art, these disadvantages, like the conductivity, are particularly due to the relatively high degree of crystallinity of the conductive polymers and organic conductors, as well as the in part considerable reactivity, particularly with respect to oxygen.

It would constitute an advance, if it proved possible to obtain stable dispersions of conductive polymers in thermoplastic polymers, because this would permit the shapability and the obtaining of morphological polymer blend structures optimizing the conductivity. The technical usability of polyacetylene and most conventional conductive polymers is particularly prevented by the fact that the electrical and in particular mechanical characteristics decrease very rapidly after a short time and in particular after complexing. It would therefore constitute an extraordinary advance, if it proved possible to form or mould conductive polymers, whilst both during and after the forming process achieving a stabilization against degradation by oxygen, moisture, heat and internal crosslinking processes.

It would be of great practical significance if it would be possible to disperse electrically conductive polymers and/or organic conductors in a thermoplastic matrix resulting on the one hand in a homogeneous distribution of the conductive polymer or organic conductor and on the other hand a micromorphology of the incorporated conductive polymer yielding the desired electrical properties of the entire polymer blend. It is accordingly an object of the invention to find a possibility to convert electrically conductive polymers and/or organic conductors such as PAc, PPP, PPy, PPhc or TCNQ charge transfer complexes etc. into formable polymer blends from which shaped bodies with good mechanical properties and increased electrical conductivity can be made, and to achieve at the same time a stabilisation against the various known degradation mechanisms, especially oxidation and cross-linking.

SUMMARY OF THE INVENTION

The invention relates to a process for producing mouldable polymer blends from electrically conductive organic polymers and/or organic conductors, as well as a matrix polymer, which is characterized in that substantially monomer-free, electrically conductive organic polymers and/or organic conductors are dissolved or dispersed in a melt or solution of a thermoplastic polymer or polymer mixture partially compatible therewith and having a solubility parameter of >8.6 $(cal/cm^3)^{\frac{1}{2}}$ until a homogeneous material has formed which, when visually observed, has a different colour from the conductive organic polymers and/or organic conductors and matrix polymers used, and optionally the solvent is then removed. The mass is called "homogeneous", if it appears homogeneous under an optical microscope up to an approximately 200 X magnification. Blends are considered to be homogeneous which, apart from a few rare coarser particles to be looked upon as faults, have an average particle size below 20 microns, preferably below 5 microns and in optimum cases around and below 1 microns e.g. 50 to 200 nm (electron-microscopically detectable).

Suitable matrix polymers are thermoplastic polymers with high solubility parameter and a surface tension of >35 dyn/cm such as polyethers, polyesters, polyvinylidene chloride or fluoride, polyamide, polycaprolactone, polyurethane, cellulose partially esterified with acetic, propionic or butyric acid, partially esterified polyvinyl alcohol or partially esterified polyvinyl acetate, polyvinyl pyrrolidone, polyvinyl butyral, water-soluble or water-swellable polymers such as e.g. polyacrylic acid, liquid-crystalline polymers such as e.g. thermoplastic liquid-crystalline polyesters, ionomers or polymers having polar functional groups, polyacrylonitrile, copolymers thereof or mixtures of the aforementioned polymers. It is also possible to use reactive monomer and/or prepolymer mixtures, which can be completely polymerized to the matrix polymer after producing the dispersion. Examples are caprolactam, diol/dicarboxylic acid and diisocyanate/diol/polyester or polyether mixtures or other suitable reaction (injection) moulding materials.

For obtaining an optimum dispersion, it is important that the secondary and tertiary structures (agglomerates) obtained during the polymerization of the conductive polymers are extensively disintegrated, i.e. preferably down to the primary particles. It is important for producing the electrically conductive polymer blends, that the conductive particles are in contact and that for this purpose the concentration of the conductive polymer or organic conductor is above the volume concentration critical for the electrical conductivity, i.e. the so-called percolation point. A description of the physical laws of percolation in connection with the example of electrically conductive carbon black is given by K. Miyasaka J. Mat. Sci., Vol. 17, pp. 1610 to 1616, 1982.

The concentration is preferably in the vicinity of the interfacial—energy equilibrium, where the sum of the cohesion energy is equal to the sum of the adhesion energy and occurs through chain formation. This means in practice that the quantity of conductive polymers and/or organic conductors in the polymer blend can be between 3 and 35% by weight, as a function of the chosen material pairs and preferably the concentration is at least 8% by weight. The concentration may be still lower, i.e. between about 0.5 and 3% by weight, if it is desired to prepare antistatic mixtures.

The dispersion of the conductive polymer and/or organic conductor in the physical—chemical partially compatible matrix polymer according to the invention is largely achieved through the high interfacial energy between the participating substances. Thus, matrix polymers with a particularly high surface tension are used. In order to facilitate dispersion the matrix polymer is either melted accompanied by heating and shearing or is dissolved in a suitable solvent, which is then removed.

Polymers with low solubility parameters, such as polyolefins or olefin copolymers with a solubility parameter of $<8.6$ $(cal/cm^3)^{\frac{1}{2}}$ are less suitable according to the invention. Instead of a dispersion in the matrix polymer, agglomeration occurs, so that polycrystalline microcrystal needles or fibrils of approximately 5 to 50 microns form, which through contact with one another can lead to a conductivity of the polymer blend. Surprisingly, this is possible with amorphous powders of the conductive polymers if, in place of matrix polymers with high solubility parameters, those with low solubility parameters well below 8.6 $(cal/cm^3)^{\frac{1}{2}}$ are used, e.g. polyethylene, and ultrasonics are applied to the melt, so that the aforementioned microcrystal needles or fibrils form.

According to a further embodiment of the invention the organic conductor, e.g. a TCNQ charge transfer complex, is dissolved in a suitable matrix polymer, e.g. polycaprolactone, using solvents or applying a melt, optionally assisting the dissolution by ultrasonics and/or heat; by slowly cooling or tempering the conductor crystallizes in the form of thin needles in the melt or the solidifying polymer, said needles preferably contacting each other. Antistatic or electrically conductive moulded articles are obtained in this manner.

Chain-like strings or spherical primary particles form in the continuous polymer matrix and above the percolation point. This leads to a type of interfacial-energy equilibrium through the formation of the same number of contact points between the conductive polymer particles, as between the latter and the matrix polymer. Thus, the conductive particles form submicroscopic, widely branched conductor paths or a through conductor network.

The electrical conductivity of the organic polymers can be significantly increased by doping (complexing) before or after the production of the polymer blend. Complexing agents which are suitable are known per se, iodine, antimony or arsenic pentafluoride, tetrafluoro boric acid, perchlorates, sulphurtrioxide, sulphonates or metal salts and in particular iron(III)-chloride being particularly suitable for p-doping and butyl lithium, triphenylhexyl-lithium, naphthalin-sodium and the like being particularly suitable for n-doping.

In order to obtain special semiconductor characteristics, which can e.g. be used for optical information storage and processing, it is advantageous to incorporate into a polymer blend homogeneously p-doped and homogeneously n-doped predispersed conductive polymers in such a way that each p-doped particle, isolated by the matrix polymer is surrounded by n-doped particles and vice versa. Through the use of external energy sources, e.g. laser light, the particles can be excited in a clearly defined manner to give conductive, three-dimensional structures.

According to the invention, a homogeneous doping can be obtained, if doping (complexing) is performed with the doping agent (e.g. $I_2$ or $FeCl_3$) in a solution and under ultrasonic action. Either the completely polymerized and undoped conductive polymers, e.g. PAc or PPhc, or the monomers, e.g. pyrrole are used. When monomers are used, polymerization and doping simultaneously take place. It has been found that the homogeneously doped polymers give products, which are much more stable with respect to decomposition or disintegration (conductivity reduction). Doping under ultrasonic action can be performed in the presence or absence of the non-conducting matrix polymer.

The product is recovered by filtration, centrifugation and/or lyophilization.

It has also proved possible to subsequently homogenize and predisperse heterogeneously doped conductive polymers such as e.g. PPy powder synthesized by known methods, in that they are suspended in a neutral, alkaline or acid aqueous or organic suspension and exposed to the action of ultrasonics.

The doping of e.g. polyacetylene under the action of ultrasonics in a solution or dispersion leads to completely different characteristics (particularly more uniform doping, higher conductivity and crystallinity or greater extension of the crystallites, increased stability, improved processability) of the conductive polymers compared with doping of e.g. foils or films through gaseous complexing agents ($J_2$, $AsF_5$, etc) or suspended, macroscopically large particles (cf e.g. EP-OS 62,221) through dissolved complexing agents (e.g. $FeCl_3$). If the latter process is called a "heterogeneous" doping process, then the presently found process can be called a "homogeneous" doping process. Homogeneously doped PAc in polymer blends, e.g. with cellulose propionate forms microscopically fine homogeneous, possibly liquid-crystalline particles or fibres of below 20 microns, which under the microscope through a polarization filter dark position appear bright and are highly conductive.

For increasing the processing stability, conventional antioxidants (e.g. phenolic antioxidants) and/or crosslinking inhibitors (e.g. phosphonites) can be added to the polymer blend in a quantity of preferably 0.01 to 0.5% by weight, together with other processing aids in a quantity of 1 to 5% by weight. Optionally, light-collecting, fluorescent dyes are added for producing photoconducting polymer blends. For the protection of the oxidation-sensitive conductive polymer, it is recommended to work under a protective gas or in vacuo when producing the polymer blend. The polymer blends produced according to the invention have the particular advantage that the conductive polymer is very well protected against oxidative decomposition and/or crosslinking both during dispersion and during the subsequent shaping process, as a result of the dispersion in the matrix polymer. This can be in particular optimized by the choice of matrix polymers with particularly low $O_2$ and $H_2O$ permeability coefficients.

The polymer blends according to the invention and the moulded articles produced therefrom have a different colour compared with the pulverulent starting substances or simple mechanical mixtures thereof. The colour is characteristic of the particular conductive polymer and can be measured on ultra-thin coatings. In the case of the polymer blend of polyacetylene and polycaprolactone the polyacetylene colour e.g. changes from black to deep blue, a sign of the conductive polymer being truly dispersed in the polymer matrix. Polychromism occurs in the case of poly-$\mu$-cyano(phthalocyaninato)cobalt (III). For complete dispersion, accompanied by deagglomeration of the secondary particles of the conductive organic polymer in the thermoplastic matrix, either a particularly suitable matrix polymer having an optimum compatibility with the conductive polymer is used, or the melt or solution of the matrix polymer is exposed to ultrasonics. Alternatively, it is also possible to initially disperse the conductive polymer in the solvent under ultrasonic action and to only then add the matrix polymer. Ultrasonics has the advantage that the mixture is locally exposed to very high alternating pressures without macroscopic shearing stress occurring, the latter leading to a considerable mechano-chemical decomposition risk. Ultrasonics are preferably used for dispersion purposes when the compatibility of the carrier polymer with the conductive polymer to be dispersed or the interfacial energy is not sufficient for wetting the primary particles in this way alone and consequently break down the secondary and tertiary structures.

It has been found that there are a few matrix polymer-conductive polymer pairs, which lead to a satisfactory dispersion without additional dispersion energy. These are undoped polyacetylene and polycaprolactone or cellulose propionate, as well as poly-$\mu$-cyano(phthalocyaninato)-cobalt (III) and cellulose propionate. Other pairs, e.g. polypyrrole and cellulose propionate or polyvinylpyrrolidone, doped polyacetylene and cellulose propionate, poly-$\mu$-cyano(phthalocyaninato) cobalt (III) and polyvinylpyrrolidone require ultrasonics as an additional dispersing energy source.

The conductive polymer should be free of monomer and preferably also free of oligomer.

The invention also relates to an apparatus for performing the process according to the invention using ultrasonics. It is an extruder characterized in that one or more sonotrodes project into the transformation zone through the barrel wall. The apparatus is illustrated by the attached drawings, wherein show:

FIG. 1 a longitudinal section through a screw extruder according to the invention.

Figure 2:
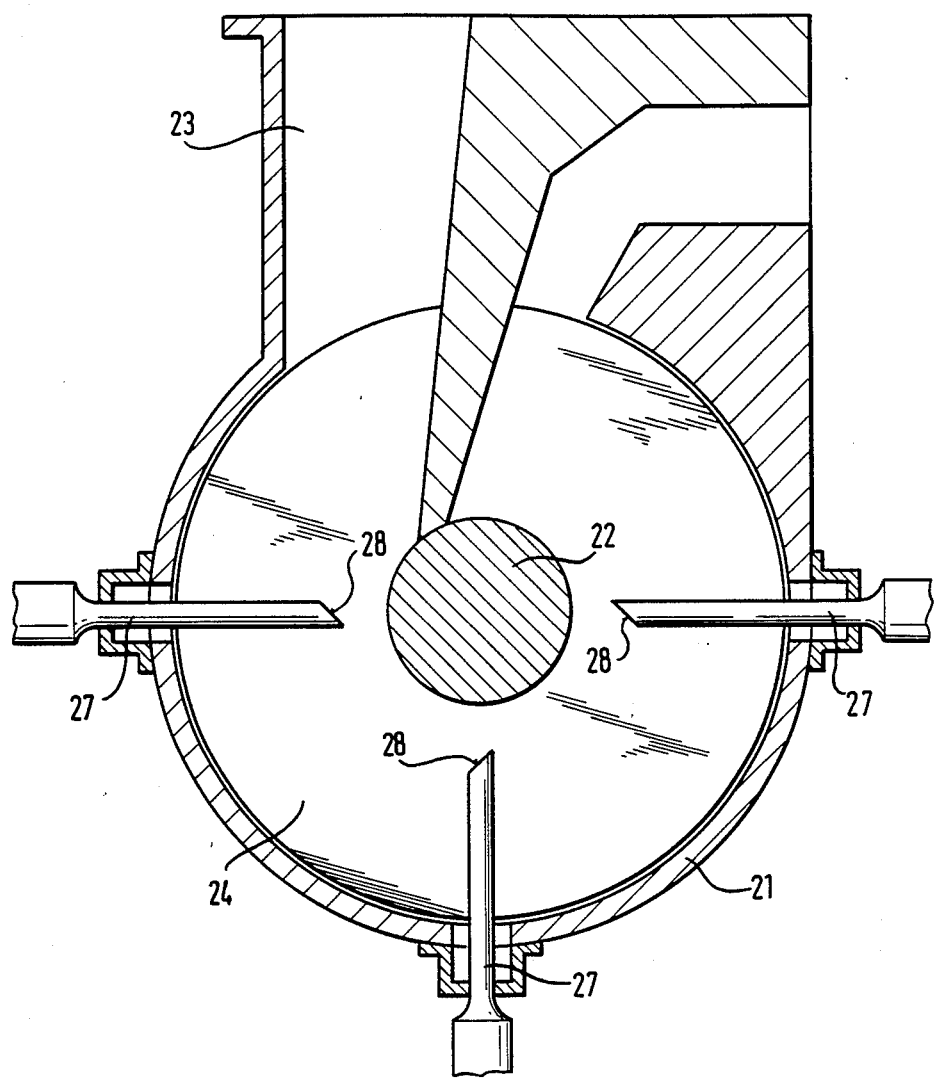

FIG. 2 a section through a disk extruder according to the invention at right angles to the driving shaft.

Figure 3:
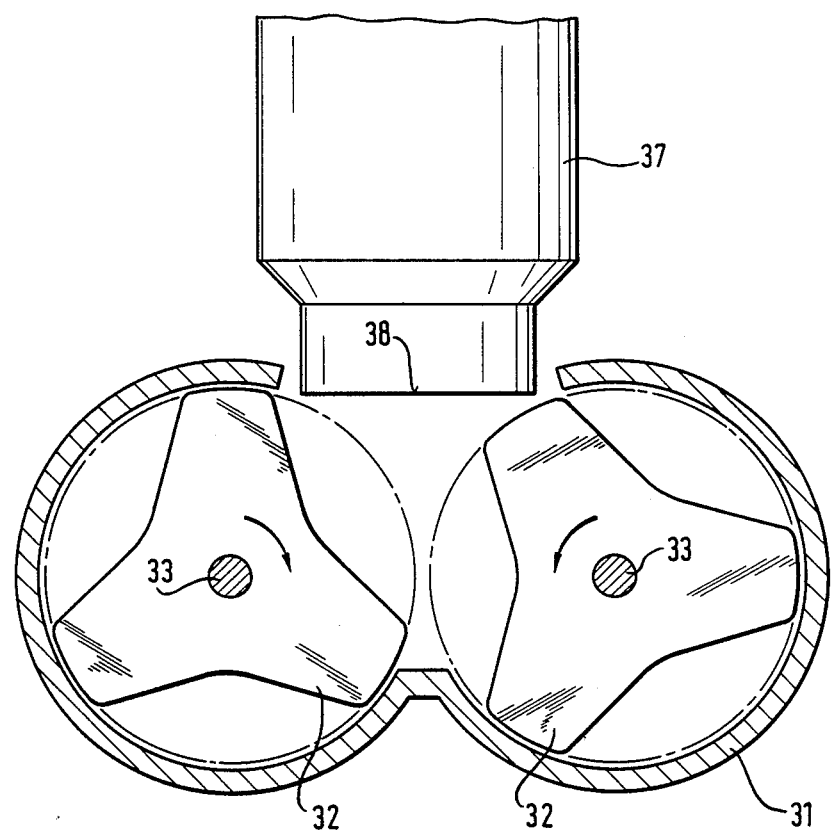

FIG. 3 a section through a kneader (internal mixer) with a die.

A sonotrode is immersed in free-swinging manner in the mass for carrying out the inventive process of ultrasonics-supported dispersion of the conductive organic polymer and/or organic conductor in a melt or solution of the matrix polymer. A power supply, a converter, a booster (transducer) and the actual sonotrode are required for ultrasonics generation. These parts are matched to one another in such a way that the maximum oscillation energy is roughly 20 kHz per sonotrode at the sonotrode end face. The sonotrode can be made from aluminium or preferably titanium steel. The total power provided by the sonotrode or sonotrodes should be 5 to 30% of the drive power of the extruder motor.

In an embodiment of the apparatus according to the invention, the 135 mm long sonotrode 17 projects through the barrel wall 11 into the transformation zone 16 of a screw extruder. In the vicinity of sonotrode 17, the screw flights 14 are partly ground away, so that reduced height flights 15 are obtained, whilst a space is formed into which the sonotrode can project. The end face 18 of sonotrode 17 is arranged at right angles to the sonotrode axis.

At the booster end, the sonotrode is connected to the extruder, a barrier on the sonotrode at the zero passage of the oscillations (e.g. with half the length) prevents a possible advance of the melt to the booster.

On operating the apparatus, the starting materials are supplied under a protective gas atmosphere to the extruder by means of the charging hopper 13. The extruder is either filled with inert gas or is operated in vacuo in order to prevent oxidative decomposition of the conductive organic polymers and/or organic conductors.

According to a further embodiment, the apparatus according to the invention can also be a modified disk extruder. Such disk extruders are fundamentally known, cf Z. Tadmor et al, Plastics Engineering, Part I, pp. 20-25, 1979 and part II, 11-34-39, 1979. Such a disk extruder comprises a cylindrical casing 21 and a driven shaft 22, on which are arranged a plurality of parallel disks 24. Normally, mixing fingers project into the gaps between the disks and improve the thorough mixing of the components by shearing.

According to the invention, one or more of these mixing fingers are replaced by sonotrodes 27. It is advantageous in this case, if the end faces 28 of the sonotrodes 27 are at an angle to the sonotrode axis. Angles between 30° and 60°, preferably an angle of approximately 45° are suitable.

Here again, charging takes place by means of the supply hopper 23 under a protective gas atmosphere, whilst the actual apparatus can either be operated under a protective gas atmosphere or in vacuo, in order to exclude moisture and oxygen.

FIG. 3 shows another embodiment of the apparatus in the form of a pressure arm-operated kneader or internal mixer. Within the casing (kneading chamber) 31, the kneading blades 32 rotate in opposite directions about their shafts 33. Sonotrode 37 projects from above into the kneading chamber so that the sound pressure waves emanating from the end face 38 act on the material being kneaded.

The invention finally relates to the use of the polymer blends obtained with the aid of the inventive process for producing moulded articles, particularly for electrical components such as conductors, semiconductors or photoconductors. Using the polymer blends, it is possible e.g. to produce electrical components such as semiconductor relays, thyristors or the like, as well as batteries. Photovoltaic uses. e.g. in solar technology for directly producing electric power from light are also possible. Other uses are permanent antistatic packagings or components for information storage and processing.

It is not at present possible to provide an explanation for the invention and the surprising effects thereof. The following hypotheses could provide a possible explanation, without the invention being bound thereto:

All the conductive polymers form under conventional conditions of hetergeneous polymerization, sphere-like primary particles, which aggregate in an unordered manner.

These particles can only be reversibly separated under the specific conditions according to invention and on exceeding the percolation point re-agglomerate to give conductive, chain-like structures.

The conductivity mechanisms are the same in pure, unshaped crude conductive polymers comprising aggregated primary particles alone as in the homogeneous polymer blend above the percolation point.

Apart from the known causes of the instability, a further possibly decisive cause is that the known methods of heterogeneous doping lead to heterogeneous agglomerates which (e.g. by diffusion processes) attempt to become homogeneous and thereby destroy the internal structures.

An optimum case for a conductive polymer blend is consequently a homogeneously doped conductive polymer, which is homgeneously dispersed in ultra-finely divided form in the matrix polymer, the latter also exercising a protective function against possible oxygen attack.

The following examples serve to further illustrate the invention, without restricting the latter thereto.

EXAMPLE 1

0.185 g of black trans-polyacetylene with 2 mg of a phenolic antioxidant and 2 mg of phosphonite are dispersed in a solution of 1.67 g of polycaprolactone in 10 ml of dimethyl formamide under ultrasonic action, followed by the removal of the solvent. This led to an elastic, thermoplastically processable film, which is intense blue in transmitted light.

EXAMPLE 2

The complex of tetracyanoquinodimethane (TCNQ) with N-methyl-quinoline was dissolved in dimethyl formamide with a green colour. Polycaprolactone was added to this solution in the ultrasonic bath. After removing the solvent, as a function of the complex concentration, black to dark green masses were obtained, which can be thermoplastically processed e.g. to films. The quantities used, dissolved in each case in 10 ml of dimethyl formamide, are given in the following table 1.

TABLE 1

| TCNQ complex % by weight | (g) | Polycaprolactone (g) | Conductivity (S/cm) | Remarks |
|---|---|---|---|---|
| 2 | 0.040 | 1.960 | $3 \times 10^{-8}$ | transparent |
| 5 | 0.140 | 2.660 | $3 \times 10^{-5}$ | opaque |
| 10 | 0.279 | 2.511 | $1.6 \times 10^{-5}$ | opaque |
| 20 | 0.321 | 1.284 | $1.3 \times 10^{-6}$ | impermeable |
| 30 | 0.431 | 1.000 | $2 \times 10^{-6}$ | impermeable |
| 40 | 0.563 | 0.845 | $2 \times 10^{-7}$ | impermeable |

It is clear that the best conductivity is between 5 and 20% TCNQ complex. After removing the solvent, the complex is crystallized in the polymer matrix. The optical microscope reveals fine needles and larger crystalline particles and this is particularly marked with a TCNQ content of 5%.

The TCNQ-N-methylquinoline complex may be incorporated in polycaprolactone in the form of needles in an analogous manner. A dissolution of the needles could be achieved (a) by applying ultrasonics and/or (b) by heating the mass to 120° to 190° C. for 0.5 to 2 minutes. On slowly cooling the homogeneous melt, e.g. in the form of films, crystallization in the form of fine needles can be achieved resulting in similar conductivities as in Table 1.

EXAMPLE 3

9 g of polycaprolactone were melted in a round-bottomed flask and 1 g of polyacetylene (synthesized according to the Luttinger method, cf B. Wessling, Makrom, Chem. Vol. 185, pp. 1265-1275, 1984) was added under flowing nitrogen. An ultrasonic sonotrode is introduced directly into the melt for dispersion purposes and the mixture cooled after exposing to sound waves for 30 minutes. The solid mass obtained can be thermoplastically processed. A thin-pressed film thereof has a similar distribution to that of example 1 under the microscope. This elastic film also appears dark blue in transmitted light. An improvement to the distribution (=reduction of the number of larger undivided particles) is obtained, if the process is identically performed in a dispersion kneader whose die is constructed as a sonotrode (cf. FIG. 3).

EXAMPLE 4

A film obtained according to example 1, which contained 0.185 g (10%) polyacetylene in 1.66 g of polycaprolactone, was exposed for one day at ambient temperature to a nitrogen atmosphere saturated with iodine vapour. The initial conductivity of $6\times10^{-8}$ Siemens/cm rose to $2\times10^{-4}$ Siemens/cm.

EXAMPLE 5

50 g of cellulose propionate were added to a dispersion mixer and plasticized. 0.5 g of poly-$\mu$-cyano (phthalocyaninato) cobalt (III) powder was then added. Once again under ultrasonic action, a very homogeneous dispersion was obtained, which could not be resolved even in the case of high magnifications in the optical microscope.

EXAMPLE 6

At 22° C., 50 g of alkyl sulphonate and 33.5 g of pyrrole were dissolved in 1500 ml of water, accompanied by stirring. The solution was buffered to pH 4. Within 90 minutes, 150 g of $FeCl_3 \times 6H_2O$ dissolved in 300 ml of water were added dropwise to said mixture. The product was filtered through a nutsch filter, washed three times with water and then dried. In order to obtain very fine particles, the synthesis was performed in a parallel test under ultrasonic action. In this case, the product was separated by centrifuging. The electrical conductivity was 1 to 10 Siemens/cm.

For subsequent treatment, the product obtained (approx. 50 g) was dispersed under ultrasonic action in 1n NaOH (1010 ml) and was exposed to sound waves for approximately 1 hour, after which the product was filtered and rinsed three times with water. The PPy lost approximately 50% of its weight. After drying, the PPy had a conductivity of $10^{-3}$ Siemens/cm. The basic-treated PPy was then again dispersed with ultrasonics, but in 1 liter of a mixture of 1 part 35% hydrochloric acid and 3 parts methanol. After filtering and washing three times with methanol, the product was dried and was found to have a conductivity of 10 Siemens/cm.

EXAMPLE 7

15 g of polyacetylene powder were suspended in 800 ml of toluene and transferred into a flask. This was followed by the addition of 200 ml of a solution of 20 g of iodine in toluene. The flask was sealed under nitrogen and provided with a reflux condenser, which was closed with a balloon. The flask was placed in an ultrasonic bath in such a way that violent turbulence was visible on exposure to sound waves. The reaction medium temperature rose to 50° to 60° C. The ultrasonics were switched off after 10 hours and it was allowed to stand for 1 day. During processing, filtration took place under nitrogen and it was rinsed several times with toluene, until it was no longer possible to detect iodine, and dried. A conductive PAc with a conductivity of up to 50 Siemens/cm was obtained.

The following results were obtained with other solvents:
Toluene, after washing with DMF: 1 Siemens/cm
DMF: 0.5 Siemens/cm
Butyl acetate: 4 Siemens/cm
Complexing with $FeCl_3$ in $CH_3CN$: 6 Siemens/cm.

The homogeneously doped PAc was incorporated in polycaprolactone (surface resistance $10^{12}\Omega$) in a dispersion kneader applying ultrasonics. Using 49.5 grams of polycaprolactone and 0.5 grams of PAc the following results were obtained (at a mass temperature of 60° C.): 15 minutes dispersion time: bluish, semi-transparent film with some dots, $10^{10}\Omega$, 60 minutes dispersion time: intense blue, semi-transparent film, almost free of dots, $10^9\Omega$.

COMPARISON EXAMPLE 1

In accordance with example 1 and under ultrasonics 56 mg of poly-$\mu$-cyano(phthalocyaninato)cobalt (III) in 4 mg of polycaprolactone were dispersed with the aid of 5 ml of dimethyl formamide. After removing the solvent, a film was obtained which, in incident light, appeared dark blue, appeared turquoise in transmitted light and appeared violet in laterally inciding light. The conductivity was only $5\times10^{-11}$ Siemens/cm. Only a slight improvement to $3\times10^{-10}$ Siemens/cm resulted from a concentration increase to 20%. This was due to the incomplete dispersion of the particles, as is apparent under the optical microscope on a thin-pressed film. The dispersion is obviously not in the interfacial-energy equilibrium.

COMPARISON TEST 2

According to example 3, polyacetylene was incorporated into a polyethylene melt. The mass obtained contained visually detectable black particles (spots) following extrusion. A film produced from the polymer bath had no blue colouring. Thus, polyethylene is normally an unsuitable matrix polymer for the purposes of the inventive process.

Figure 4:
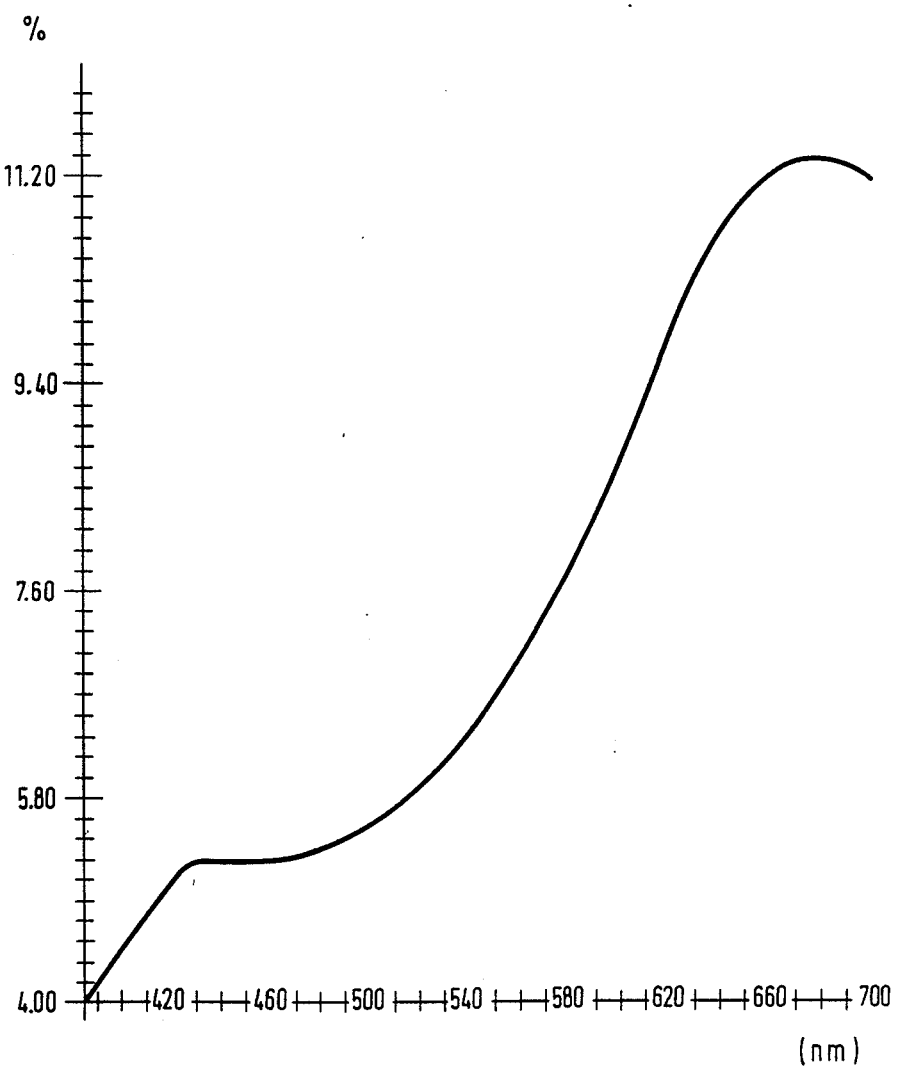
Figure 5:
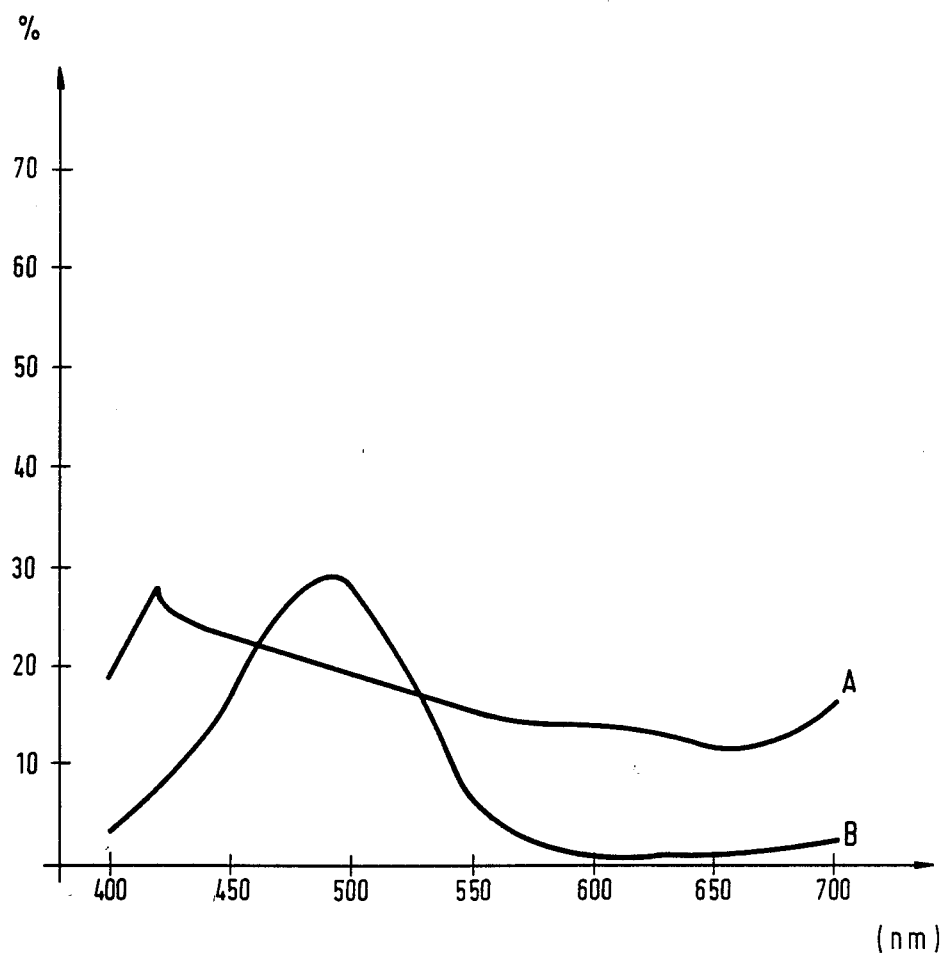

FIGS. 4 and 5 show the transition spectra of the polymer blend produced according to the invention, namely FIG. 3 for polypyrrole in cellulose propionate, FIG. 5 curve A 0.5% polyacetylene in cellulose propionate, curve B 0.44% poly-$\mu$-cyano(phthalocyaninato)-cobalt (III) in cellulose propionate.

We claim:

1. Method for preparing a moldable polymer blend comprising the steps of
    liquifying a thermoplastic matrix component selected from the group consisting of polymers and polymer mixtures, which component has a solubility parameter of greater than 8.6 $(cal/cm^3)^{\frac{1}{2}}$ and a surface tension of 35 dyn/cm or more; and
    dispersing a conductive component in said liquified thermoplastic matrix component, said conductive component being selected from the group consisting of conductive polymers and organic conductors, so as to form a homogeneous blend.

2. Method according to claim 1 wherein said thermoplastic matrix component is a polymer selected from the group consisting of polyethers, polyesters, polyvinylidene chloride, polyvinylidene fluoride, polyamide, polycaprolactone, polyurethane, cellulose partially esterified with acetic, propionic or butyric acid, partially esterified polyvinyl alcohol, partially esterified polyvinyl acetate, polyvinyl pyrrolidone, polyvinyl butyral polyacrylic acid, liquid crystalline polyesters, ionomers or polymers having polar functional groups, and polyacrylonitrile.

3. Method according to claim 2 wherein said thermoplastic matrix component is a copolymer or mixture of said polymers.

4. Method according to claim 1 wherein said thermoplastic matrix component is liquified by heating the component to a melt.

5. Method according to claim 1 wherein said thermoplastic matrix component is liquified by dissolution in a solvent, and after formation of said blend, the solvent is removed.

6. Method according to claim 5 wherein said solvent is selected from the group consisting of toluene, dimethyl formamide, butylacetate, and $CH_3CN$.

7. Method according to claim 1 wherein the conductive component comprises from 0.5 to 35% by weight of said blend.

8. Method according to claim 1 wherein the conductive component comprises at least 8% by weight of said blend.

9. Method according to claim 1 wherein said said conductive polymers are selected from the group consisting of polyacetylene, poly-1,3,5 . . . n-substituted polyacetylenes, acetylene copolymers, 1,3-tetramethylene-bridged polyenes, polyparaphenylenes, polypyrroles, polyphthalocyanines, polyanilines and polyperinaphthalines.

10. Method according to claim 1 wherein said organic conductors comprise non-polymeric organic complex salts or charge transfers complexes.

11. Method according to claim 10 wherein the organic conductor is a tetracyanoquinodimethane salt.

12. Method according to claim 1 wherein said components are subjected to ultrasonic shearing during formation of the blend.

13. Method according to claim 1 wherein said homogeneous blend has a different color appearance than either the thermoplastic matrix component and the conductive component.

14. Method according to claim 1 wherein said matrix component is polycaprolactone or cellulose propionate, and said conductive component is polyacetylene.

15. Method according to claim 1 wherein said matrix component is cellulose propionate, and said conductive component is poly-$\mu$-cyano(phthalocyaninato)-cobalt-(III).

16. Method according to claim 1 wherein said conductive component is n-doped or p-doped.

17. Method according to claim 16 wherein the conductive component is doped with a compound selected from the group consisting of:
 iodine, antimony pentafluoride, arsenic pentafluoride, tetrafluoro boric acid, perchlorates, sulphurtrioxide, sulphonates, iron (III)-chloride, butyl-lithium, diphenyl-hexyl-lithium, and naphthalin sodium.

18. Method for preparing a moldable polymer blend comprising the steps of:
 (a) dispersing a conductive component in a solvent under ultrasonic action, said conductive component comprising a conductive polymer or an organic conductor; and
 (b) mixing a thermoplastic matrix component with said dispersed conductive component, said thermoplastic matrix component being selected from the group consisting of polymers and polymer mixtures, which matrix component has a solubility parameter of greater than 8.6 $(cal/cm^3)^{\frac{1}{2}}$ and a surface tension of 35 dyn/cm or more.

19. Method according to claim 18 comprising the further step of doping the conductive component with a compound selected from the group consisting of:
 iodine, antimony pentafluoride, arsenic pentafluoride, tetrafluoro boric acid, perchlorates, sulphurtrioxide, sulphonates, iron (III)-chloride, butyl-lithium, diphenyl-hexyl-lithium, and naphthalin sodium.

20. Method according to claim 1, wherein the polymer blend is prepared under an inert gas atmosphere or vacuum.

* * * * *